(12) United States Patent
Shah et al.

(10) Patent No.: US 12,317,197 B2
(45) Date of Patent: May 27, 2025

(54) MECHANISM FOR UPLINK WAVEFORM SWITCHING

(71) Applicant: T-Mobile Innovations LLC, Overland Park, KS (US)

(72) Inventors: Anokhi Shah, Bellevue, WA (US); Mochamad Mirza, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 619 days.

(21) Appl. No.: 17/564,410

(22) Filed: Dec. 29, 2021

(65) Prior Publication Data

US 2023/0209474 A1    Jun. 29, 2023

(51) Int. Cl.
*H04B 7/185* (2006.01)
*H04L 27/26* (2006.01)
*H04W 52/14* (2009.01)
*H04W 52/24* (2009.01)
*H04W 52/36* (2009.01)

(52) U.S. Cl.
CPC ....... *H04W 52/243* (2013.01); *H04L 27/2607* (2013.01); *H04L 27/2636* (2013.01); *H04W 52/146* (2013.01); *H04W 52/365* (2013.01)

(58) Field of Classification Search
CPC .......... H04B 10/564; H04W 52/146; H04W 52/243; H04W 52/365
See application file for complete search history.

(56) References Cited

U.S. PATENT DOCUMENTS

| 9,866,343 B1 * | 1/2018 | Sung ................. H04L 27/26 |
| 2017/0244587 A1 * | 8/2017 | Wild ................. H04L 27/2627 |
| 2022/0303981 A1 * | 9/2022 | Sakhnini ............... H04W 72/51 |
| 2023/0337200 A1 * | 10/2023 | Ali .................... H04W 74/0833 |

* cited by examiner

*Primary Examiner* — Shantell L Heiber
(74) *Attorney, Agent, or Firm* — Shook, Hardy & Bacon L.L.P.

(57) ABSTRACT

Systems, methods, and computer-readable media are described herein which dynamically provide an optimized mechanism for switching uplink waveforms within a cellular network. An uplink profile generally indicates a number of transmission ports and what uplink waveform is used by a user device to transmit to a base station. A power headroom, channel conditions, and signal to interference plus noise ratio are used to modify the uplink profile. These inputs may be compared to upper and lower threshold values to provide optimal conditions to switch from a Cyclic Prefix Orthogonal Frequency Division Multiplexing waveform (CP-OFDM) to a Direct Fourier Transform Spread Orthogonal Frequency Division Multiplexing waveform (DFT-s-OFDM).

20 Claims, 6 Drawing Sheets

MECHANISM FOR UPLINK WAVEFORM SWITCHING

SUMMARY

A high-level overview of various aspects of the present disclosure is provided here to introduce a selection of concepts further described in the detailed description. This summary is neither intended to identify key features or essential features of the claimed subject matter, nor intended to be used as an aid in isolation to determine the scope of the claimed subject matter.

In brief and at a high level, the present disclosure describes, among other things, systems, methods, and computer-readable media that employ a mechanism for switching uplink waveforms in a cellular network, such that unnecessary switching does not occur, and an available transmission power is used to capitalize on the benefits of available uplink transmission waveforms.

BRIEF DESCRIPTION OF THE DRAWINGS

Illustrative embodiments of the present disclosure are described in detail below with reference to the attached drawing, wherein.

DETAILED DESCRIPTION

Figure 1:
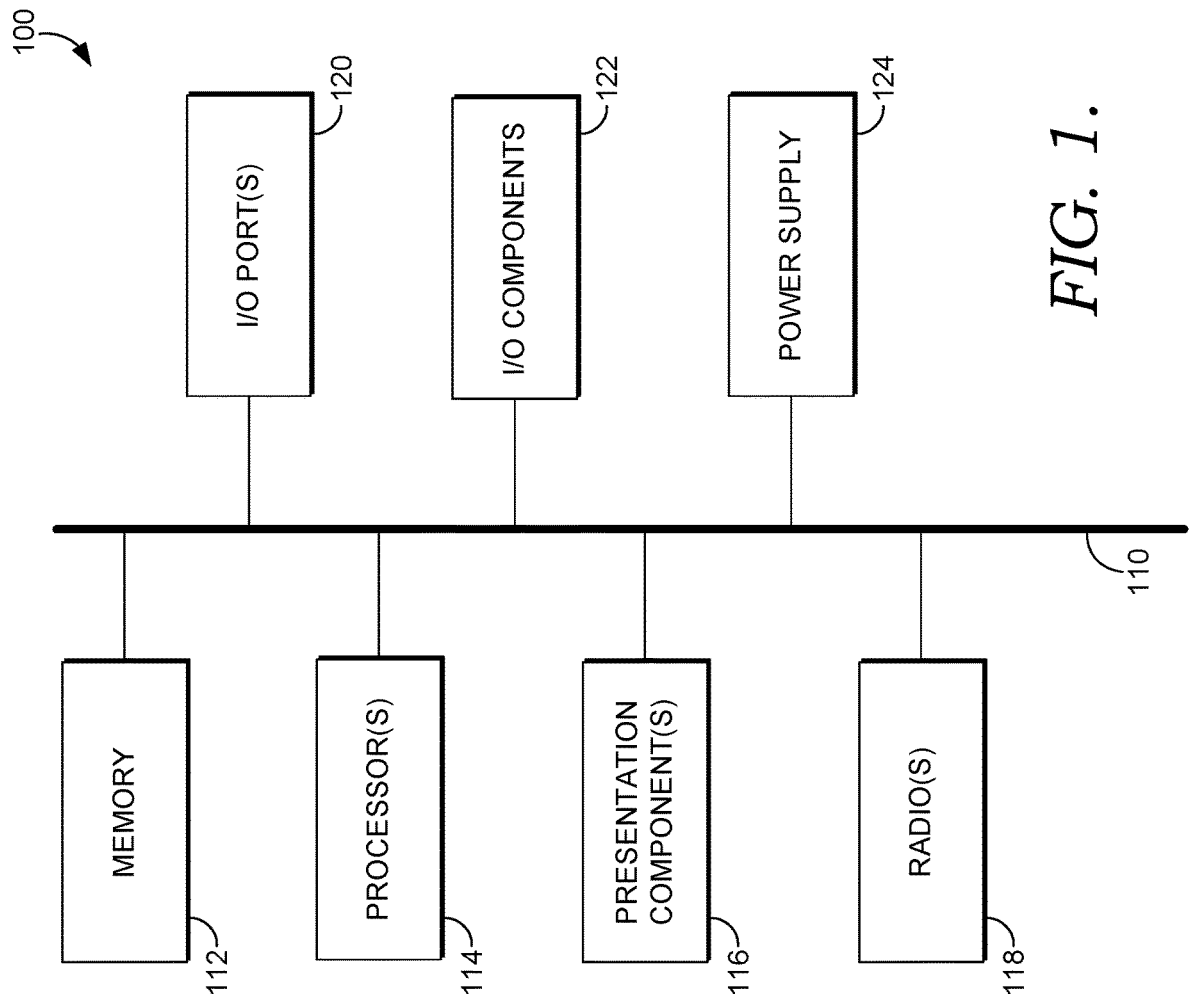
FIG. 1 illustrates an exemplary computing device suitable for use in implementations of aspects described herein.

The subject matter of selective embodiments of the present disclosure are described with specificity herein to meet statutory requirements. The detailed description is neither intended to define what is regarded as the invention nor intended to limit the scope of the claimed subject matter. The claimed subject matter might be embodied in other ways to include different steps or combinations of steps similar to those described herein, in conjunction with other present or future technologies. Terms recited herein should not be interpreted to imply any particular order among or between various steps described herein unless and except when an order of individual steps is explicitly described.

Throughout the detailed description of the present disclosure, several acronyms and shorthand notations are used to aid the understanding of certain concepts pertaining to an associated system and services. These acronyms and shorthand notations are solely intended for the purpose of providing an easy methodology of communicating the ideas expressed herein and are in no way meant to limit the scope of the present disclosure. Further, various technical terms are used throughout the detailed description. Definitions of such terms can be found in, for example, Newton's Telecom Dictionary by H. Newton, 31st Edition (2018). These definitions are intended to provide a clear understanding of the ideas disclosed herein but are not intended to limit the scope of the present disclosure. The definitions and the terms should be interpreted broadly and liberally to an extent allowed by the meaning of the words offered in the above-cited reference.

Embodiments of the technology described herein may be implemented as, among other things, a method, a system, or a computer-program product. Accordingly, the embodiments include a hardware embodiment, or an embodiment combining a software and a hardware. In one embodiment, the present disclosure includes the computer-program product that includes computer-useable instructions embodied on one or more computer-readable media.

The computer-readable media includes volatile and/or nonvolatile media, removable and non-removable media, and contemplates media readable by a database, a switch, and various other network devices. Network switches, routers, and related components are conventional in nature, as are the means of communicating with the same. By way of non-limiting example, the computer-readable media includes computer storage media and/or communications media. The computer storage media, or machine-readable media, includes media implemented in any method or a technology for storing information. Examples of stored information includes computer-useable instructions, data structures, program modules, and other data representations. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile discs (DVDs), holographic media or other optical disc storage, magnetic cassettes, magnetic tape, magnetic disc storage, and/or other magnetic storage devices. These memory components may store data momentarily, temporarily, or permanently. The computer storage media does not encompass a transitory signal, in embodiments of the present disclosure.

The computer readable media typically stores computer-useable instructions, including data structures and program modules, or other data in form of a modulated data signal, such as a carrier wave or other transport mechanism. The term "modulated data signal" refers to a propagated signal that has one or more of its characteristics set or changed to encode information associated therewith. The communications media includes any information-delivery media. By way of non-limiting example, the communications media includes wired media, such as a wired network or a direct-wired connection; and wireless media, such as acoustic, radio frequency (RF), infrared, radio, microwave, spread-spectrum, and other wireless media technologies. Combinations of the above are included within the scope of the computer-readable media.

At a high level, systems, methods, and the computer-readable media described herein implement an uplink waveform switch. Having symmetry between downlink (DL) and uplink (UL) transmission schemes provide simplification on an overall design, especially with respect to wireless backhaul and device-to-device communications. Additionally, an option to use Direct Fourier Transform Spread Orthogonal Frequency Division Multiplexing (DFT-s-OFDM) for uplink transmission is beneficial in coverage-limited scenarios but is limited to single transmission layer transmission only and has a lower peak-to-average power ratio (PAPR)/cubic metric than Cyclic Prefix Orthogonal Frequency Division Multiplexing (CP-OFDM) for power reduction purposes. The CP-OFDM, in contrast, may support up to four transmission layers, which helps to achieve higher data rates. The low PAPR/cubic metric in DFT-s-OFDM, however, is beneficial for user equipment (UE) power consumption. In practice, a cell site may select between the CP-OFDM or DFT-s-OFDM and the UE may be capable of supporting both. However, a switching between these different waveforms is complex, involving radio resource control (RRC) reconfiguration, and requires an efficient model to enable the switching.

To provide an optimized switching between the DFT-s-OFDM and the CP-OFDM, both uplink channel conditions and an available uplink power transmission is considered. By using this information, the UE may take full advantage of the benefits each waveform offers. If the UE runs out of uplink transmission power and if a signal to interference and noise ratio (SINR) is good, switching to the DFT-s-OFDM waveform may not be triggered, which results in losing benefits like larger coverage and better cell performance due to PAPR advantages provided by the CP-OFDM. Additionally, if uplink SINR conditions deteriorate and the UE has enough uplink transmission power, it may operate on the CP-OFDM waveform to provide benefits from two transmission ports. Also, if uplink SINR conditions deteriorate and there is negligible power headroom, a network switch from the CP-OFDM waveform to the DFT-s-OFDM waveform may render the system more robust.

According to a first aspect of the present disclosure, a method is provided. The method includes receiving a radio channel condition indication from a user device. The method further includes receiving an uplink power headroom indication from the user device. An uplink signal to interference and noise ratio (SINR) is determined based on the radio channel condition. Based on an uplink SINR value, it is determined whether: (a) the uplink SINR has exceeds an uplink SINR threshold and (b) an available uplink transmission power is greater than a transmission power threshold, and instructions are sent to the user device to transmit by way of two transmission ports and to transmit by way of a first waveform, such as the CP-OFDM waveform.

According to a second aspect of the present disclosure, computer-readable media is provided. The computer-readable media includes computer-executable instructions embodied thereon that, when executed, perform a method for implementing an uplink waveform switching is provided. The method executed by the media comprising receiving a radio channel condition indication from a user device. The method further comprises receiving an uplink power headroom indication from the user device. An uplink signal to noise ratio (SINR) is determined based on the radio channel condition. Based on the uplink SINR value it is determined that the uplink SINR has fallen below an uplink SINR threshold, and the available uplink transmission power is above a transmission power threshold and instructions are sent to the user device to transmit by way of two transmission ports and to transmit by way of a CP-OFDM waveform.

According to a third aspect of the present disclosure, a system is provided. The system includes one or more computer components configured to receive an indication that the user device is communicating with a wireless access point using a first uplink profile, where the first uplink profile includes an uplink waveform and an uplink transmission port configuration. A channel condition of an uplink channel is received from the user device. It is determined whether the channel condition exceeds a predetermined threshold and instructions are sent to the user device to modify the first uplink profile.

Referring now to FIG. 1, an exemplary computing environment suitable for use in implementations of the present disclosure is illustrated. In particular, the exemplary computer environment is shown and designated generally as a computing device 100. The computing device 100 may be an example of a suitable computing environment and is not intended to suggest any limitation to the scope of use or functionality of the present disclosure. Neither should the computing device 100 be interpreted as having any dependency or requirement relating to any one or combination of components illustrated in FIG. 1.

The implementations of the present disclosure may be described in a general context of a computer code or machine-useable instructions, including computer-executable instructions such as program components, being executed by a computer or other machine, such as a personal data assistant or other handheld device. Generally, the program components, including routines, programs, objects, components, data structures, and the like, refer to a code that performs particular tasks or implements particular abstract data types. Implementations of the present disclosure may be practiced in a variety of system configurations, including handheld devices, consumer electronics, general-purpose computers, specialty computing devices, and the like. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: a memory 104, one or more processor(s) 106, one or more presentation component(s) 108, input/output (I/O) port(s) 110, I/O components 112, and a power supply 114. The bus 102 represents what may be one or more busses (such as an address bus, a data bus, or a combination thereof). Although the devices in FIG. 1 are shown with lines for the sake of clarity, in reality, delineating various components is not so clear, and, metaphorically, the lines would more accurately be grey and fuzzy. For example, one may consider a presentation component such as a display device to be one of the I/O components 112. Also, processors, such as the one or more processor(s) 106, includes the memory 104. The present disclosure recognizes that such is the nature of the art and reiterates that FIG. 1 is merely illustrative of the exemplary computing environment that may be used in connection with one or more implementations of the present disclosure. Distinction is not made between such categories as "a workstation," "a server," "a laptop," "a handheld device," etc., as all are contemplated within the scope of FIG. 1 and refer to "a computer" or "a computing device."

The computing device 100 typically includes a variety of computer-readable media. The computer-readable media may be any available media that may be accessed by the computing device 100 and includes both the volatile and nonvolatile media, the removable and non-removable media. By way of a non-limiting example, the computer-readable media may include the computer storage media and the communications media. The computer storage media includes both volatile and nonvolatile, removable, and non-removable media implemented in any method or technology for storage of information such as computer-readable instructions, data structures, program modules, or other data. The computer storage media does not comprise a propagated data signal.

The memory 104 includes the computer-storage media in form of a volatile and/or non-volatile memory. The memory 104 may be removable, non-removable, or a combination thereof. Examples of the memory 104 include a solid-state memory, hard drives, optical-disc drives, etc. The computing device 100 includes the one or more processor(s) 106 that read data from various entities such as the bus 102, the memory 104, or the I/O components 112. The one or more presentation component(s) 108 presents data indications to a person or another device. Examples of the presentation component(s) 108 include a display device, a speaker, a printing component, a vibrating component, etc. The I/O port(s) 110 allow the computing device 100 to be logically coupled to other devices including the I/O components 112, some of which may be built in the computing device 100. The I/O components 112 include a microphone, a joystick, a game pad, a satellite dish, a scanner, a printer, a wireless device, etc.

A radio(s) 116 of the computing device 100 represents a radio that facilitates communication with a wireless telecommunications network. Wireless telecommunications technologies include, but are not limited to, code-division multiple access (CDMA), general packet radio service (GPRS), time-division multiple access (TDMA), global system for mobile communication (GSM), and the like. The radio(s) 116 might additionally or alternatively facilitate other types of wireless communications including wireless fidelity (Wi-Fi), worldwide interoperability for microwave access (WiMAX), long-term evolution (LTE), or other voice over internet protocol (VoIP) communications. As may be appreciated, in various embodiments, the radio(s) 116 may be configured to support multiple technologies and/or multiple radios may be utilized to support multiple technologies. The wireless telecommunications network might include an array of devices, which are not shown so as to not obscure more relevant aspects of the present disclosure. Components, such as a base station, a communications tower, or access points (as well as other components) may provide wireless connectivity in some embodiments.

Figure 2:
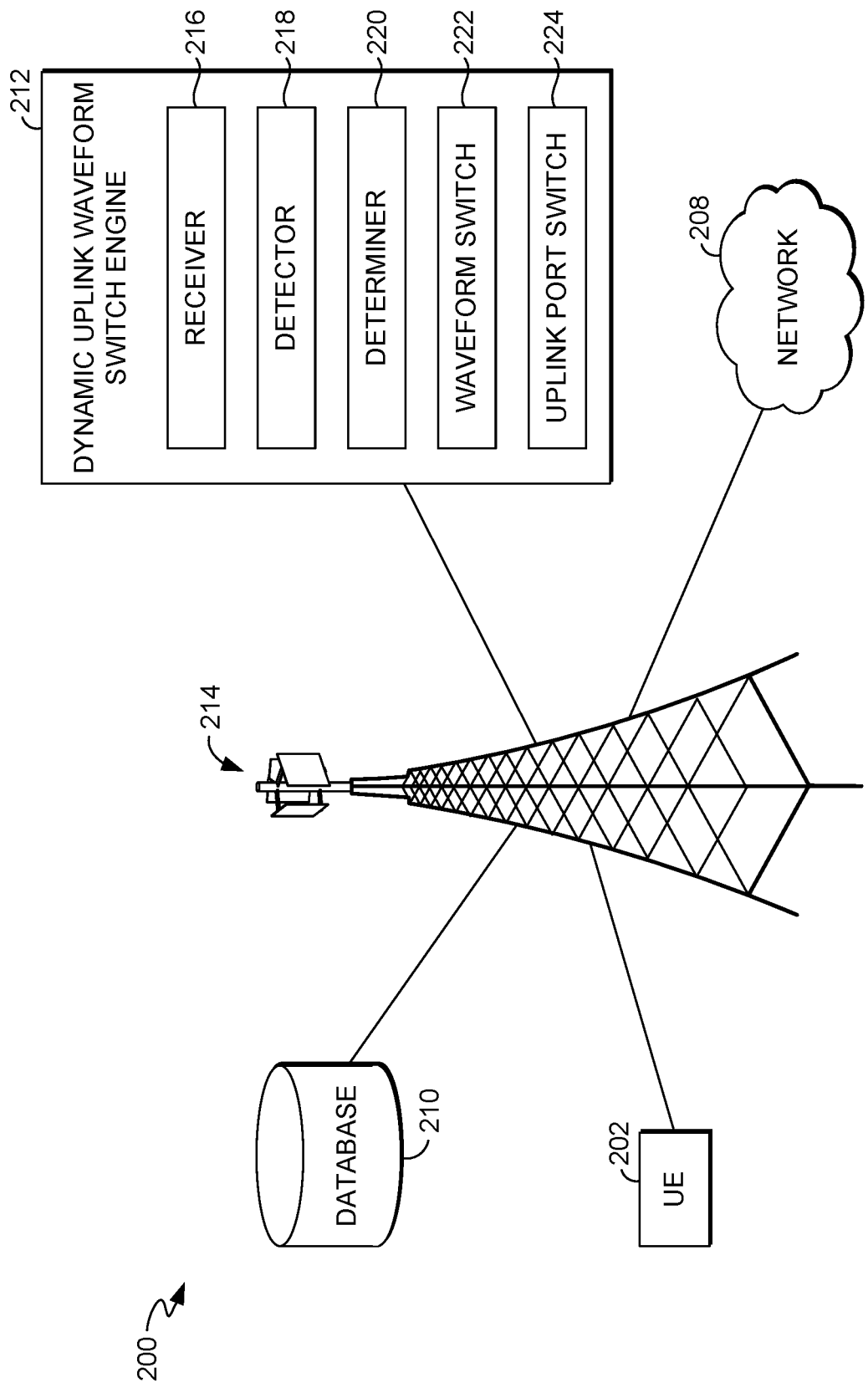
FIG. 2 illustrates an exemplary network environment, in accordance with an embodiment of the present disclosure.

Turning now to FIG. 2, a network environment 200 is an exemplary network environment in which implementations of the present disclosure may be employed. The network environment 200 is one example of a suitable network environment and is not intended to suggest any limitation as to the scope of use or functionality of the present disclosure. Neither should the network environment be interpreted as having any dependency or requirement relating to any one or combination of components illustrated.

The network environment 200 includes a UE 202 (the network environment 200 may contain more UEs), a network 208, a database 210, a dynamic antenna element disablement engine 212, and a cell site 214. In the network environment 200, the UE 202 may be implemented as, for example, a personal computer (PC), a user device, a smart phone, a smart watch, a laptop computer, a mobile phone, a mobile device, a tablet computer, a wearable computer, a personal digital assistant (PDA), a server, a compact disk (CD) player, an mpeg-1 audio layer III or mpeg-2 audio layer III (MP3) player, GPS device, a video player, a handheld communications device, a workstation, a router, an access point, or any combination of these delineated devices, or any other device that communicates via wireless communications with the cell site 214 in order to interact with the network 208, which may be a public or a private network.

In some aspects, the UE 202 corresponds to the user device or the computing device. For example, the user device may include a display(s), a power source(s) (for example, a battery), a data store(s), a speaker(s), a memory (such as the memory 104), a buffer(s), a radio(s) (such as the radio 116), and the like. In some implementations, the UE 202 includes a wireless or mobile device with which the wireless telecommunications network(s) may be utilized for communication (for example, voice and/or data communication). In this regard, the user device may be any mobile computing device that communicates by way of a wireless network, for example, a 3G, 4G, 5G, LTE, CDMA, or any other type of network.

In some cases, the UE 202 in the network environment 200 may optionally utilize the network 208 to communicate with other computing devices (for example, a mobile device(s), the server(s), the personal computer(s), etc.) through the cell site 214. The network 208 may be a telecommunications network(s), or a portion thereof. A telecommunications network might include an array of devices or components (for example, one or more base stations), some of which are not shown. Those devices or components may form network environments similar to what is shown in FIG. 2 and may also perform methods in accordance with the present disclosure. The components such as terminals, links, and nodes (as well as other components) may provide connectivity in various implementations. The network 208 may include multiple networks, as well as being a network of networks, but is shown in more simple form so as to not obscure other aspects of the present disclosure.

The network 208 may be part of the wireless telecommunications network that connects subscribers to their service provider. In some aspects, the service provider may be a telecommunications service provider, an internet service provider, or any other similar service provider that provides at least one of voice telecommunications and/or data services to the UE 202 and any other UEs. For example, the network 208 may be associated with a telecommunications provider that provides services (for example, LTE) to the UE 202. Additionally, or alternatively, the network 208 may provide voice, short message service (SMS), and/or data services to user devices or corresponding users that are registered or subscribed to utilize the services provided by the telecommunications provider. The network 208 may include any communication network providing voice, SMS, and/or data service(s), using any one or more communication protocols, such as a 1×circuit voice, a 3G network (for example, CDMA, CDMA2000, wideband code division multiple access (WCDMA), GSM, universal mobile telecommunications system (UMTS)), a 4G network (WiMAX, LTE, high speed downlink packet access (HSDPA)), or a 5G network. The network 208 may also be, in whole or in part, or have characteristics of, a self-optimizing network.

In some implementations, the cell site 214 is configured to communicate with the UE 202 that is located within a geographical area defined by a transmission range and/or receiving range of the radio antennas of the cell site 214. The geographical area may be referred to as the "coverage area" of the cell site 214 or simply the "cell," as used interchangeably hereinafter. The cell site 214 may include one or more base stations, base transmitter stations, radios, antennas, antenna arrays, power amplifiers, transmitters/receivers, digital signal processors, control electronics, GPS equipment, and the like. In particular, the cell site 214 may be configured to wireles sly communicate with devices within a defined and limited geographical area. For the purposes of the present disclosure, it may be assumed that it is undesirable and unintended by the network 208 that the cell site 214 provides wireless connectivity to the UE 202 when the UE 202 is geographically situated outside of the cell associated with the cell site 214.

In an exemplary aspect, the cell site 214 includes a base station (not shown) that serves at least one sector of the cell associated with the cell site 214 and at least one transmit antenna for propagating a signal from the base station to one or more of the UE 202. In other aspects, the cell site 214 may include multiple base stations and/or multiple transmit antennas for each of the one or more base stations, one or more of which may serve at least a portion of the cell. In some aspects, the cell site 214 may include one or more macro cells (providing wireless coverage for users within a large geographic area) or a small cell (providing wireless coverage for users within a small geographic area). For example, the macro cells may correspond to a coverage area having a radius of approximately 1 to 15 miles or more as measured at ground level and extending outward from an antenna at the cell site. In another example, the small cell may correspond to a coverage area having a radius of approximately less than three miles as measured at ground level and extending outward from an antenna at the cell site 214.

As shown, the cell site 214 is in communication with the dynamic antenna element disablement engine 212, which includes a receiver 216, a detector 218, a determiner 220, a waveform switch controller 222, and an uplink transmission port switch 224. The dynamic antenna element disablement engine 212 (hereinafter referred to as "the engine 212) may connect the UE 202 and other UEs to frequency bands within range of the UE 202 or other UEs for access to the network 208. The engine 212 may switch an uplink waveform used by the UE 202 to transmit over the network 208. The engine 212 may communicate with the database 210 for storing and retrieving data. The engine 212 may also dynamically control a number of transmission ports used by the UE 202.

For example, the receiver 216 may retrieve data from the UE 202, the network 208, the database 210, and the cell site 214. In some embodiments, the receiver 216 may receive requests from the UEs to access a particular frequency band. Further, the receiver 216 may access information which includes, but is not limited to, location information of the UE 202, a channel quality information, a channel condition information, an uplink waveform information, and a power headroom information. The location information may include GPS or other satellite location services, terrestrial triangulation, an access point location, or any other means of obtaining coarse or fine location information. The location information may indicate geographic location(s) of one or more of the user device, an antenna, a cell tower, the cell site 214, and/or a coverage area of the cell site 214, for example. The channel quality information or the channel condition information may indicate the quality of communication between one or more user devices and a particular cell site, such as the cell site 214. For example, the channel quality information may quantify how communications are traveling over a particular communication channel quality, thus indicating an instance when communications performance is negatively impacted or impaired. As such, the channel quality information may indicate a realized uplink and/or downlink transmission data rate of a cell site (such as the cell site 214) and/or each of one or more user devices (such as the UE 202) communicating with the cell site 214, observed signal to interference plus noise ratio (SINR) and/or signal strength at the user device(s), or throughput of a connection between the cell site 214 and the user device(s).

An uplink waveform information may indicate a waveform being used by the UE 202 to broadcast or transmit. For example, the UE 202 may be operating by transmitting by way of Orthogonal Frequency Division Multiplexing using (OFDM). As an example, the DFT-s-OFDM may be used by the UE 202. Additionally, in other embodiments, the CP-OFDM may be used. The UE 202 may also transmit using other waveforms not mentioned in the present disclosure.

The power headroom information may indicate a power headroom available in the UE 202. For example, the power headroom information may indicate a difference between a maximum transmit power and a calculated transmit power for the UE 202. Values of the power headroom for the UE 202 indicates the difference between a maximum UE transmit power and a current or nominal UE transmit power. A value of the power headroom that is a positive may indicate that there is a surplus or an available transmit power for the UE 202. A value of the power headroom that is a negative may indicate that there is a deficit of the transmit power for the UE 202. The power headroom information may be received by way of either a periodic report or when a downlink path loss changes by a specific amount. An amount of the power headroom or available transmit power may indicate that there is enough available transmit power to transmit by way of more transmit ports than currently being used. For example, an excess available transmit power may be used to operate two or more transmit ports rather than one.

The location, the channel quality information, and the power headroom information may consider the UE's capability, such as a number of antennas of the user device and a type of receiver used by the user device for detection. The receiver 216 may also be configured to receive information from cell sites other than cell site 214 or other processors and/or servers.

Each sector corresponds to a radiation pattern of a corresponding antenna at the cell site 214. The shape, size, and dimension(s) of the service coverage area of the cell site 214 are, generally, determined by an antenna's specific radiation pattern, as well as a direction, an electrical tilt, a mechanical tilt, an installation height above the ground or surrounding geographic area, technical operating specifications, materials, obstructions such as, buildings, mountains, or other elevations), and power supplied to each of first, second, and third antennas of the cell site 214, for example. The first, second, and third antennas wirelessly receive and transmit RF transmissions to and from, for example, user equipment, other antennas, other cell sites, base stations, and/or satellites, in order to facilitate communications between such devices, though not shown in FIG. 2 for clarity. In an embodiment, the first, second, and third antennas of the cell site 214 captures two-way communications between the network 208 and the UE 202 that are within the geographic area corresponding to the service coverage area of the cell site 214.

Turning to the detector 218, the detector 218 may detect UEs within a range, frequency bands, sector power ratios (SPRs) of frequency bands, SINRs, and loading factors (for example, loading volume) corresponding to frequency bands, etc. The loading factors may change depending upon the day and time of day (for example, world events such as natural disasters, terror attacks, pandemics, or religious holidays may prompt surges of UE traffic to or from specific locations) and may be stored in the database 210. The loading factors may include a heat signature information of the cell site 214, component performance information of the cell site 214, the channel quality information, or processor load measurements. Factors affecting the heat signature information of the cell site 214 includes a component model, a component type, a manufacturer, age of a component, wear and tear due to environmental factors, etc. Further, the loading factors may also include an amount of current, backhaul traffic, or an anticipated current or backhaul traffic. Additionally, factors affecting loading volume may include a quantity of users connected to a frequency band or antenna properties at a time of receiving communication parameters from the UEs connected to the frequency band. Other factors affecting the loading volume may also include a capability of the frequency band and data received from the users connected to the frequency band. The data received from the users may include a rate at which the UEs are connected to and disconnected from the frequency band.

The detector 218 may also detect wireless communication operating using a particular transmission waveform. For example, the detector 218 may detect that a waveform being transmitted by the UE 202 is the DFT-s-OFDM. Additionally, the detector 218 may detect a waveform being transmitted by the UE 202 is the CP-OFDM. The detector 218 may also detect the available transmission power from the UE 202. For example, the detector 218 may detect that the UE 202 has enough available transmission power to switch the UE 202 from transmitting from a single transmission port to transmitting using two or more transmission ports.

Turning to the determiner 220, the determiner 220 may determine the SINR from the channel quality information related to the UE 202. For example, information about the channel quality or the radio channel condition (or channel quality indication (CQI)) may be used to determine the SINR for the UE 202 transmitting to the base station. Alternatively, the base station may measure or calculate the SINR independent of any CQI. Once the SINR is identified or measured, the determiner 220 may then determine if the SINR from the UE 202 exceeds a predetermined threshold. As an example, the determiner 220 may measure a value of the SINR which exceeds a threshold value. This threshold value may be set by an operator and would be used to indicate that the transmission quality has decreased below an acceptable level. Once the determiner 220 determines the threshold value of the SINR, action may be taken to reduce the SINR to an acceptable level or below the threshold value. Additionally, the determiner 220 may determine that the value of the SINR has not exceeded the threshold value and thus no action need be taken.

Once the determiner 220 determines that the value of the SINR has exceeded the threshold value, the engine 212 determines the waveform being used by the UE 202 to transmit. In an exemplary embodiment, the determiner 220 determines that the UE 202 is transmitting using the CP-OFDM waveform. In another embodiment, the determiner 220 determines that the UE 202 is transmitting using the DFT-s-OFDM waveform. Additionally, the determiner 220 determines what transmission ports the UE 202 is being used to transmit. In one embodiment, the determiner 220 determines that the UE 202 is transmitting using 2 antenna ports. In another embodiment, the determiner 220 determines that the UE 202 is transmitting using 1 antenna port. A number of ports may be determined to be more than 2 in some embodiments. The determiner 220 may also determine that the power headroom received from the UE 202 exceeds a threshold value. The threshold value is input to identify if the available power is enough to support transmitting using additional antenna ports. For instance, if the power headroom indicates that there is some available power, the determiner 220 must determine if that available power is enough to switch from a single antenna port to multiple antenna ports.

Further, the waveform switch controller 222 (hereinafter referred to as "the controller 222") is designed to switch the transmission waveform of the UE 202 based on the SINR and the power headroom threshold determinations. In one embodiment, the controller 222 will switch the waveform of the UE 202 from the CP-OFDM to the DFT-s-OFDM based on the determination that the value of the SINR has exceeded the threshold value. In another embodiment, the controller 222 will switch the waveform of the UE 202 from the CP-OFDM to the DFT-s-OFDM based on the determination that the value of the SINR has exceeded the threshold value and the number of transmission uplink ports being used is two or one. Switching from the CP-OFDM in this case requires the uplink transmission port switch 224 to switch the number of uplink port switches for the UE 202 from two to one, or from a higher number to a lower number of uplink ports. Additionally, if the power headroom indicates that there is not enough transmission power, a switch of the waveforms will not be triggered on that alone but requires the value of the SINR to be above the threshold value.

In another embodiment, the controller 222 will switch the waveform of the UE 202 from the CP-OFDM to the DFT-s-OFDM based on the determination that the value of the SINR has exceeded the threshold value and that a value of the power headroom is not sufficient to increase the number of uplink transmission ports from 1 to 2. For example, if SINR conditions deteriorate such that the value exceeds the threshold value and there is not enough power to increase transmission from one uplink port to two uplink ports, the waveform switch 222 will instruct the UE 202 to transmit using the DFT-s-OFDM waveform instead of the CP-OFDM waveform.

The uplink transmission port switch 224 may be used to increase or decrease the number of uplink ports being used to transmit on the UE 202. For example, as explained above, the uplink transmission port switch 224 will switch the number of uplink ports from two to one in the situation when the value of the SINR has exceeded the threshold value and the number of ports being used is two. Once the uplink transmission port switch 224 changes the number of uplink ports from two to one, the waveform switch 222 may then switch the waveform from the CP-OFDM to the DFT-s-OFDM.

Additionally, the uplink transmission port switch 224 may increase the number of uplink ports being used by the UE 202 from one to two. For example, if the value of the SINR has been determined to exceed the threshold value and the value of the power headroom exceeds the corresponding threshold value, the uplink transmission port switch 224 will switch the number of uplink ports being used by the UE 202 from one to two. Thus, requirement of switching the waveform may be eliminated as there is enough power to transmit using more than one uplink port.

Figure 3:
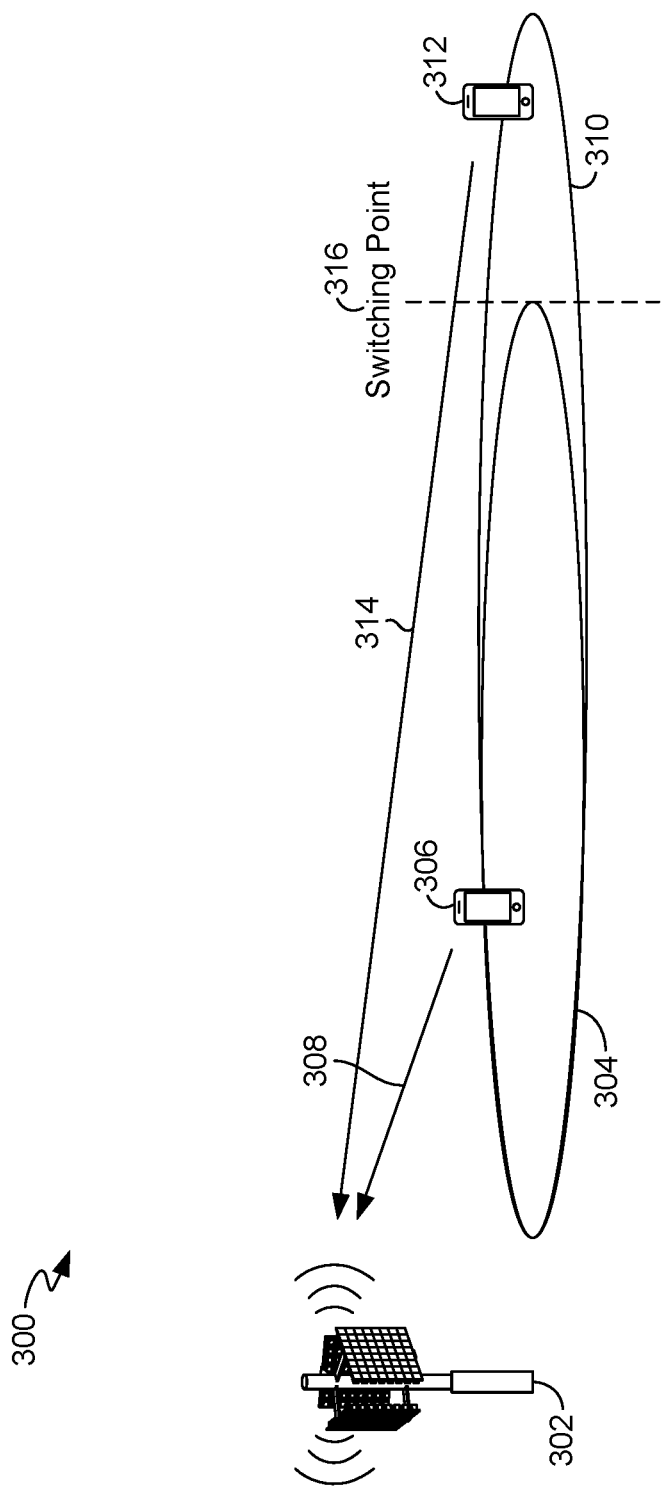
FIG. 3 illustrates an exemplary telecommunications environment, in accordance with an embodiment of the present disclosure.

Turning now to FIG. 3, an exemplary environment 300 includes a cell site 302, a first geographical area 304, a first UE 306, a first uplink waveform 308, a second geographical area 310, a second UE 312, a second uplink waveform 314, and a switching point 316. As may be seen in FIG. 3, the cell site 302 includes one or more antennas. In some aspects, the one or more antennas may be dipole antennas, having a length, for example, of ¼, ½, 1, or 1½ wavelength. In some aspects, the cell site 302 may be an active antenna array, full dimensional multiple input multiple output (FD-MIMO), massive multiple input multiple output (mMIMO), 3G, 4G, 5G, and/or 802.11. In other aspects, the one or more antennas may be monopole, loop, parabolic, traveling-wave, aperture, yagi-uda, conical spiral, helical, conical, radome, horn, and/or apertures, or any combination thereof. It is noted that adjusting one or more individual power supplies to the one or more antennas of the cell site 302 may be applicable to an antenna array including any type of antenna targeting any portion of an RF spectrum (though any lower than VHF may be size prohibitive). In one aspect, the one or more antennas may be configured to communicate in an ultra-high frequency (UHF) and/or super-high frequency (SHF) spectrum, for example, in the range of 1.3 gigahertz (GHz) to 30 GHz.

By way of a non-limiting example, a first antenna array may include 64 antenna elements arranged in an 8×8 structure. In other aspects, the first antenna array may include antenna elements arranged in an 8×4, 4×8, or 4×4 configuration. Each antenna element of the first antenna array includes a dedicated power supply having a certain phase and an amplitude to a respective antenna element. In an aspect, the power supply includes a power amplifier. In an aspect not depicted in the figures, the base station may further include a processor. The processor may be embodied to include one or more processors, servers, computer processing components, or the like. In some aspects, the processor may be communicatively coupled to each node and/or to each antenna of each node.

In certain aspects, the first antenna array may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard. In the aspect illustrated in FIG. 3, the first antenna array may include 64 antenna elements each with a distinct direction which may be known, and each antenna element may be capable of communicating with one or more devices, for example, using one or more specific beams, each identifiable as a beam index, in some aspects. In the same or alternative aspects, a device may communicate with more than one antenna element of the first antenna array. In some aspects, using the methods and systems disclosed herein, a high-density antenna array, such as the first antenna array, using the 5G wireless communication protocol as an example, may facilitate a strategic assignment of beam indices and/or allotment of beam indices tailored for a specific purpose or environment.

Some portions of FIG. 3 illustrate the areas where the DFT-s-OFDM and the CP-OFDM typically are used. When the first UE 306 is close to the cell site 302 in the first geographical area 304, channel conditions are likely to be good so that the CP-OFDM and a single transmission layer or multiple transmission layers can be used for uplink transmission. On the other hand, when the second UE 312 is located far away from the cell site 302 in the second geographical area 310, the channel conditions are likely to be poor in comparison to the first geographical area 304 so that the DFT-S-OFDM and a single transmission layer is used for the uplink transmission.

In some embodiments, the first UE 306 will be within the first geographical area 304. While within the first geographical area 304, the value of the SINR for the first UE 306 may be below the threshold value. A low value of the SINR would indicate that the channel quality is good and that no action is needed thus, the first uplink waveform 308 for the first UE 306 will be maintained. In some embodiments, the first waveform is the CP-OFDM waveform. However, there may be instances where the value of the SINR does exceed the threshold value while the first UE 306 is within the first geographical area 304. In this embodiment, the power headroom may be found to exceed the corresponding threshold value and a waveform switch would not be required but the number of uplink ports would be increased from one to two.

In another embodiment, while the second UE 312 is within the second geographical area 310, the value of the SINR may exceed the threshold value and the power headroom may not exceed the corresponding threshold value. The second UE 312 will then switch to transmit using the second uplink waveform 314 rather than the first uplink waveform 308. In some embodiments, the second uplink waveform 314 is the DFT-s-OFDM waveform. A critical point exists at the switching point 316 where the value of SINR exceed the threshold value and the power headroom value do not exceed the corresponding threshold value. The switching point 316 is where the UE will switch from the first uplink waveform 308 to the second uplink waveform 314. This location may be where the UE has exceeded a distance for the UE to be able to transmit low SINR transmissions using two uplink ports and the switch between the CP-OFDM and the DFT-s-OFDM may, in addition to the channel conditions and the power headroom, be based on the location.

Figure 4:
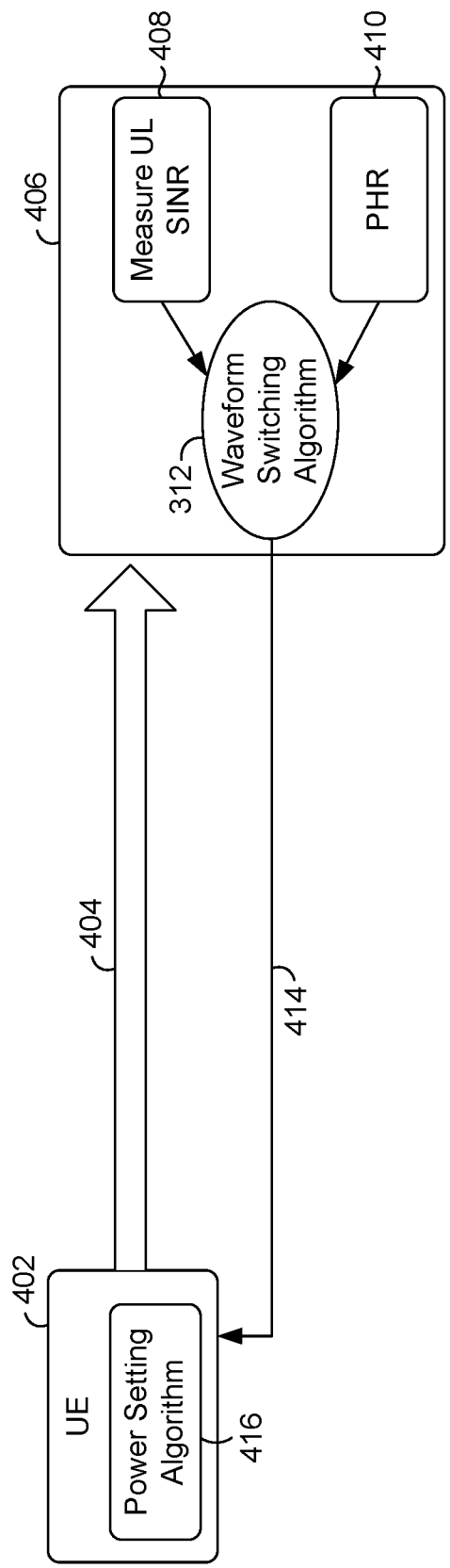
FIG. 4 illustrates an exemplary telecommunications environment, in accordance with another embodiment of the present disclosure.

Turning now to FIG. 4, an exemplary environment 400 includes a UE 402 and a cell cite 406. The UE 402 operates under conditions as described above. As such, a communication between the UE 402 and the cell site 406 provides information, such as channel quality and power headroom. For example, the UE 402 communicates through a step 404, the channel quality information, and a power headroom report 410. The power headroom report (PHR) 410 may indicate the power headroom measured either periodically or in response to deteriorating channel conditions. Upon receiving the channel quality information and the PHR 410, the cell site 406 may use that information to compute or measure SINR 408. The cell site 406 may also independently measure SINR based on an uplink transmission to the cell site 406. The PHR 410 provides, among other thing, a value of the power headroom for the UE 402.

A waveform switching algorithm 412 uses the values of the SINR and the power headroom to decide if the channel conditions have deteriorated and if a waveform switch is required. The waveform switching algorithm 412 uses decision logic as described above. For example, if the values of the SINR and the power head exceeds respective thresholds, a waveform switch is not completed but the UE 402 is instructed to increase the number of uplink ports from one to two. In another example, if the value of the SINR exceeds the threshold value and the value of the power headroom does not exceed the corresponding threshold value, the waveform switching algorithm 412 provides instructions 414 (represented as line with an arrowhead) to the UE 402 to switch transmission waveforms from the CP-OFDM waveform to the DFT-s-OFDM waveform. The instructions 414 may be communicated using radio resource control (RRC) protocols from the cell site 406 to the UE 402. The RRC protocol may indicate that the connection configuration of the UE 402 needs to be reconfigured such that the transmission waveforms are changed.

Additionally, the RRC protocol communication or the instructions 414 may provide instructions to a power setting algorithm 416. The power setting algorithm 416 receives input and provides instructions to change the number of transmission uplink ports being used. For example, the cell site 406 may provide information that the value of the SINR has exceeded the threshold value and the value of the power headroom has exceeded the corresponding threshold value. Upon receiving this information, the power setting algorithm 416 provides instructions to increase the number of transmission uplink ports from one to two.

Figure 5:
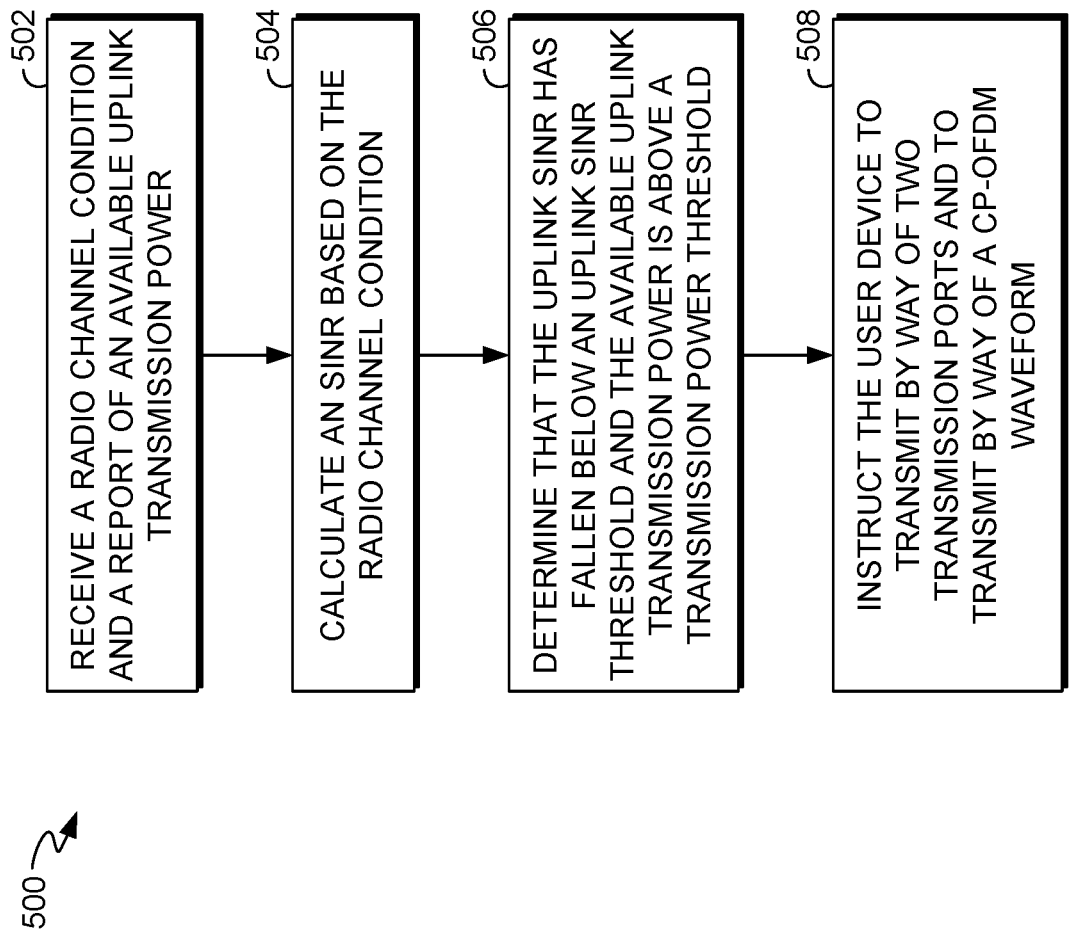
FIG. 5 illustrates a flowchart of an exemplary method, in accordance with an embodiment of the present disclosure.

Referring to FIG. 5, a flowchart of an exemplary method 500 is illustrated for implementing an uplink waveform, according to one embodiment of the present disclosure. Initially at block 502, a radio channel condition is received from the UE (for example, the UE 202). Additionally, at block 502, the report of an available uplink transmission power is received. At block 504, the SINR of the UE is calculated based on the received radio channel condition. At block 506, it is determined whether (a) the uplink SINR has fallen below an uplink SINR threshold, and (b) the available uplink transmission power is above a transmission power threshold. At block 508, the UE (also referred to as "the user device") is instructed to transmit by way of two transmission ports and to transmit by way of the CP-OFDM waveform.

Figure 6:
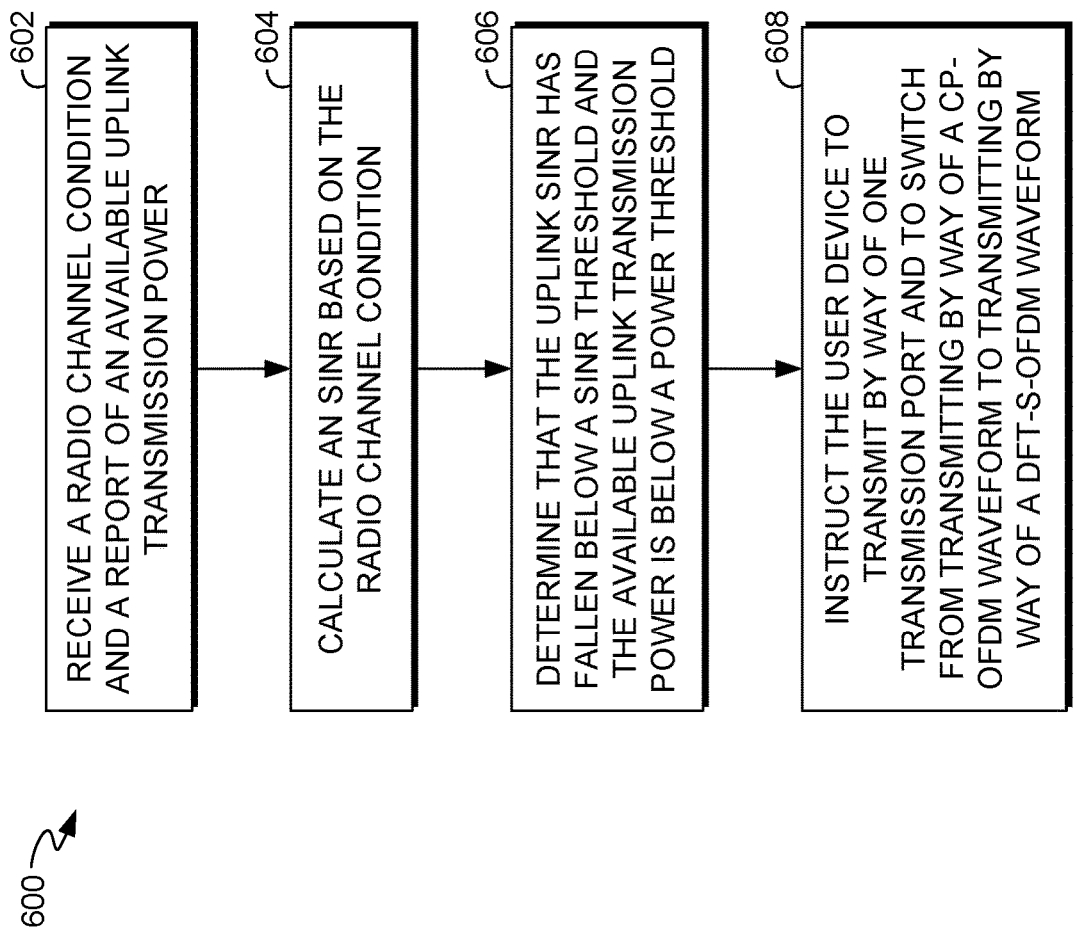
FIG. 6 illustrates a flowchart of an exemplary method, in accordance with another embodiment of the present disclosure.

Referring to FIG. 6, a flowchart of an exemplary method 600 is illustrated for implementing an uplink waveform, according to another embodiment of the present disclosure. Initially at block 602, the radio channel condition is received from the UE. Additionally, at block 602, the report of the available uplink transmission power is received. At block 604, the SINR of the UE is calculated based on the received radio channel condition. At block 606, it is determined whether: (a) the uplink SINR has fallen below a SINR threshold and (b) the available uplink transmission power is below the transmission power threshold. At block 608, the UE is instructed to transmit by way of one transmission port and to switch from transmitting by way of the CP-OFDM waveform to transmitting by way of the DFT-S-OFDM waveform.

Many different arrangements of the various components depicted, as well as components not shown, are possible without departing from the scope of the claims below. Embodiments of the present disclosure have been described with an intent to be illustrative rather than be restrictive. Alternative embodiments will become apparent to readers of the present disclosure. Alternative means of implementing the aforementioned aspects may be completed without departing from the scope of the claims below. Certain features and sub-combinations of aspects of the present disclosure are of utility and may be employed without reference to other features and sub-combinations and are contemplated within the scope of the claims.

What is claimed is:

1. A method for implementing an uplink waveform switching, the method comprising:
   receiving an uplink power headroom indication from a user device;
   determining an uplink signal to interference and noise ratio (SINR) based on a radio channel condition;
   determining whether: (a) the uplink SINR exceeds an uplink SINR threshold, (b) determining that a location of the user device has not exceeded a distance for the user device to be able to transmit low SINR transmissions, and (c) an available uplink transmission power is greater than a transmission power threshold; and
   based on the determining, instructing the user device to transmit by way of two transmission ports and to transmit by way of a first waveform.

2. The method of claim 1 further comprising receiving a radio channel condition indication.

3. The method of claim 2, wherein the uplink SINR is determined based on the radio channel condition indication.

4. The method of claim 1, wherein the transmission power threshold indicates an availability of enough power to transmit over two or more transmission ports.

5. The method of claim 1, wherein the instructing comprises providing instructions to the user device by way of a radio resource control reconfiguration.

6. The method of claim 1, wherein the first waveform is a Cyclic Prefix Orthogonal Frequency Division Multiplexing (CP-OFDM) waveform.

7. A method for implementing an uplink waveform switching, the method comprising:
   receiving a report of a power headroom indication from a user device;
   calculating an uplink signal to interference plus noise ratio (SINR);
   determining whether: (a) the uplink SINR has fallen below an uplink SINR threshold, (b) an available uplink transmission power is below a transmission power threshold, and (c) determining that a location of the user device has exceeded a distance for the user device to be able to transmit low SINR transmissions;
   based on the determining, instructing the user device to transmit by way of one transmission port and to switch from transmitting by way of a first waveform to transmitting by way of a second waveform.

8. The method of claim 7 further comprising receiving a radio channel condition indication.

9. The method of claim 8 wherein the uplink SINR is calculated based on the received radio channel condition indication.

10. The method of claim 7, wherein the transmission power threshold indicates an availability of enough power to transmit over two or more transmission ports.

11. The method of claim 7, wherein the instructing comprises providing instructions to the user device by way of a radio resource control reconfiguration.

12. The method of claim 7, wherein the first waveform is a Cyclic Prefix Orthogonal Frequency Division Multiplexing (CP-OFDM) waveform.

13. The method of claim 7, wherein the second waveform is a Direct Fourier Transform Spread Orthogonal Frequency Division Multiplexing (DFT-s-OFDM) waveform.

14. A system for implementing an uplink waveform switch, the system comprising:
   one or more computer components configured to:
   receive an indication that a user device is communicating with a wireless access point using a first uplink profile, the first uplink profile comprising an uplink waveform and an uplink transmission port configuration;
   receive, from the user device, a channel condition indication of an uplink channel;
   determine whether the channel condition indication of the uplink channel exceeds a predetermined threshold;
   determine a location of the user device and calculate a signal to interference plus noise ratio (SINR);
   determine that the location of the user device has exceeded a distance for the user device to be able to transmit low SINR transmissions; and
   based on the determinations, instruct the user device to modify the first uplink profile.

15. The system of claim 14, further comprising determining that the user device has exceeded the distance to be able to transmit the low SINR transmissions using two uplink ports.

16. The system of claim 14, wherein instructing the user device depends on the SINR exceeding a second predetermined threshold.

17. The system of claim 16, wherein the uplink waveform is a Cyclic Prefix Orthogonal Frequency Division Multiplexing (CP-OFDM) waveform.

18. The system of claim 14, wherein the one or more computer components are configured to:
    receive a power headroom indication from the user device; and
    modify the first uplink profile based on the received power headroom indication.

19. The system of claim 18, wherein a modification to the first uplink profile comprises modifying the uplink waveform.

20. The system of claim 19, wherein the modification to the first uplink profile comprises modifying the uplink transmission port configuration.

\* \* \* \* \*